United States Patent
Koch et al.

(10) Patent No.: US 9,184,858 B2
(45) Date of Patent: Nov. 10, 2015

(54) MICROPHONE SYSTEM AND METHOD FOR SELECTING AN OPERATING FREQUENCY FOR A OR SAID MICROPHONE SYSTEM AND COMPUTER PROGRAM

(75) Inventors: Hartwig Koch, Hildesheim (DE); Holger Kiehne, Peine (DE); Florian Klingler, Munich (DE); Frank Hofmann, Hildesheim (DE); Gerald Spreitz, Laatzen (DE); Sascha Jakoblew, Hildesheim (DE); Radu Circa, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 13/508,574

(22) PCT Filed: Sep. 22, 2010

(86) PCT No.: PCT/EP2010/063964
§ 371 (c)(1),
(2), (4) Date: Jul. 24, 2012

(87) PCT Pub. No.: WO2011/054598
PCT Pub. Date: May 12, 2011

(65) Prior Publication Data
US 2012/0281848 A1    Nov. 8, 2012

(30) Foreign Application Priority Data
Nov. 9, 2009    (DE) .......................... 10 2009 046 548

(51) Int. Cl.
| | |
|---|---|
| H04R 29/00 | (2006.01) |
| H04B 17/309 | (2015.01) |
| H04B 17/24 | (2015.01) |
| H04M 1/725 | (2006.01) |

(52) U.S. Cl.
CPC .............. *H04B 17/309* (2015.01); *H04B 17/24* (2015.01); *H04R 29/00* (2013.01); *H04M 1/72511* (2013.01)

(58) Field of Classification Search
CPC .... H04R 29/00; H04R 29/004; H04R 29/007; H04B 17/309
USPC ............................................................ 381/58
See application file for complete search history.

(56) References Cited

U.S. PATENT DOCUMENTS

| | | | |
|---|---|---|---|
| 5,418,839 A | 5/1995 | Knuth et al. | |
| 5,898,928 A * | 4/1999 | Karlsson et al. | ............... 455/450 |
| 5,937,002 A * | 8/1999 | Andersson et al. | ........... 375/131 |

(Continued)

FOREIGN PATENT DOCUMENTS

| | | |
|---|---|---|
| DE | 10035824 | 2/2002 |
| WO | 99/09671 | 2/1999 |
| WO | 2006095152 | 9/2006 |

OTHER PUBLICATIONS

PCT/EP2010/063964 International Search Report dated Feb. 3, 2011 (Translation and Original, 6 pages).

*Primary Examiner* — Sonia Gay
(74) *Attorney, Agent, or Firm* — Michael Best & Friedrich LLP

(57) ABSTRACT

Wireless microphones are used in a plurality of applications, such as concerts, discussions, theater performances, operas, etc. The wireless microphones are normally connected to a transmitter which transmits the audio signals captured by the microphone to a base station via a transmitting frequency. The invention relates to a microphone system (1) having a base station (3) and having a microphone module (2) wherein the base station (3) is designed to wirelessly receive audio information and/or test information transmitted from the microphone module (2) on an operating frequency, wherein the base station (3) has a receiving analysis module (14) and/or is coupled thereto, which is designed to analyze the reception quality of the audio information and/or the test information on a plurality of possible transmitting frequencies, wherein the receiving analysis module (4) is designed to select the operating frequency from the plurality of possible transmitting frequencies.

20 Claims, 5 Drawing Sheets

(56) References Cited

U.S. PATENT DOCUMENTS

| | | | |
|---|---|---|---|
| 6,317,598 B1* | 11/2001 | Wiesen et al. | 455/443 |
| 2008/0056166 A1* | 3/2008 | Suzuki et al. | 370/280 |
| 2009/0213902 A1* | 8/2009 | Jeng | 375/133 |
| 2009/0318087 A1 | 12/2009 | Mattila et al. | |

* cited by examiner

MICROPHONE SYSTEM AND METHOD FOR SELECTING AN OPERATING FREQUENCY FOR A OR SAID MICROPHONE SYSTEM AND COMPUTER PROGRAM

BACKGROUND

The invention relates to a microphone system having a base station and having a microphone module, wherein the base station is designed to receive audio information and/or test information, transmitted on an operating frequency, wirelessly from the microphone module, wherein the base station has a reception analysis module and/or is coupled to the latter which is designed for analyzing the quality of reception of the audio information and/or of the test information at a number of possible transmitting frequencies. The invention also relates to a method for selecting an operating frequency for such a microphone system and a computer program.

Wireless microphones are used in a plurality of applications such as concerts, discussions, theater performances, operas etc. The wireless microphones are usually connected to a transmitter which transmits the audio signals captured by the microphone to a base station via a transmitting frequency. Starting from the base station, the audio signals are then forwarded to recording devices, amplifiers etc. In the case of larger events, it is quite normal that a multiplicity of such wireless microphones are used. Considering, for example, a concert, more than 40 or 50 wireless microphones are often used in parallel operation. Due to this parallel operation, the necessity arises to match the transmitting frequencies of the individual wireless microphones to one another in such a manner that a separate channel is allocated to each wireless microphone. The installation of the wireless microphones is thus involved and complicated.

In printed document DE 10035824 A1 which may well form the nearest prior art, a system for controlling mobile transmitting and/or receiving devices connected wirelessly to a central processing unit is described. The central processing unit and the transmitting and/or receiving devices are connected via means for bidirectional communication providing for a simple configuration of the transmitting and/or receiving devices. By means of the system, a higher-level administration, selection and control of the operating parameters of the wireless transmission links is possible.

SUMMARY

In its general embodiment, the invention relates to a microphone system which has at least one base station and at least one microphone module. Base station and microphone module are designed in such a manner that audio information and/or test information transmitted from the microphone module via an operating frequency can be received by the base station. The microphone module is subdivided into a microphone section which is designed for picking up audio signals and a transmitter section which handles the wireless communication with the base station. In particular, the microphone module is designed to be portable. The base station is preferably designed to be stationary and has preferably an interface such as, for example, an audio interface, a USB interface, DECT interface or the like in order to forward the audio signals e.g. on an amplifier or to a recording device. The audio information reproduces the audio signals and is designed, for example, as coded audio signals. The test information is artificial test sequences which do not necessarily have to correspond to an audio signal.

The base station has a reception analysis module and/or is coupled to the latter. The reception analysis module is designed for analyzing the quality of reception, and hence the quality of transmission of the audio information and/or of the test information which has been transmitted by the microphone module, at a number of possible transmitting frequencies. It is thus possible that the microphone module transmits the information via various transmitting frequencies, for example in a test, and the reception analysis module analyzes, and thus determines and/or quantifies as a parameter, the respective quality of reception.

According to the invention, it is proposed that the reception analysis module is designed for selecting the operating frequency from the plurality of possible transmitting frequencies. In particular, the selection is automated and/or based on the qualities of reception of the transmitting frequencies.

The invention is based on the concept that it is advantageous if the selection of the operating frequency does not take place by means of a trial-and-error method but by means of an objective selection method, and/or in automated manner. This improves the selection, reduces the setup time of the microphone system and, in the end, optimizes the quality of reception of the microphone system set up. In particular, the quality of reception, and thus the quality of transmission between the microphone module as transmitter and the base station as receiver is taken into consideration as a basis for decision. The assessment of the quality of reception and thus of the quality of transmission is distinctly more reliable than a pure measurement of the interference power at the base station. The reason for this is that the spectral form and the behavior of an interference signal with time are also a part of the quality of reception, and not only their power. At the same power as an interference signal of wider bandwidth, a narrow-band interferer such as, for example, a sinusoidal carrier has fewer effects on the quality of reception and thus the quality of transmission.

In a further development of the invention it is provided that the audio information and/or the test information is designed or transmitted, respectively, as digital signals. Such digital signals allow high control of the transmission quality in that transmission parameters such as, e.g., the compression and/or the redundancy of the signals transmitted can be adapted with respect to the initial signals. Furthermore, the transmission of digital signals enables the test information to be designed as a test sequence which is preferably already known to the base station so that a high-quality assessment of the quality of reception is possible.

In a particularly preferred embodiment of the invention, the quality of reception is analyzed on the basis of a bit error rate, a bit error ratio and/or on the basis of a channel bit error rate. The bit error rate or the bit error ratio, respectively, is determined in that the base station, as receiver, compares a known bit sequence transmitted as test information or test sequence with a stored bit sequence and determines missing or wrong bits and determines from the number or temporal distribution the respective error parameter and thus the quality of reception. As an alternative or additionally, the base station as receiver, can decode the transmitted bit sequence first and then encode it again and compare it with the transmitted bit sequence, in the case of unknown bit sequences in the test information. By means of this procedure, the so-called channel bit error rate can be estimated which can also form a basis for analyzing the quality of reception.

In a possible development of the invention, a frequency analysis module is provided which is designed for analyzing a transmitting frequency spectrum for free transmitting frequencies. In this context, the frequency analysis module can be a component of the microphone module and/or of the base station and/or of a further component of the microphone system. It is the task of the frequency analysis module to detect free undisturbed transmitting frequencies. These free transmitting frequencies are provided, for example, as a list. The transmitting frequency spectrum and/or the transmitting frequencies and/or the operating frequency is advantageously in the VHF/UHF frequency band. Since these frequency bands are also used by terrestrial television, the microphone systems are second users of these frequency bands. This means that the microphone system is only allowed to use free frequencies, that is to say frequencies not occupied by television, at the application site. In addition, there may also be disturbances by other electrical devices on some frequencies. A further interference source are intermodulations between the microphone modules or intermodulations of other signals with one another or other signals to the microphone modules. These disturbances are also detected by the frequency analysis module and taken into consideration in the detection of free frequencies.

In a preferred embodiment of the invention, the plurality of possible transmitting frequencies is selected from the list of free transmitting frequencies. The analysis of free transmitting frequencies thus sets a first restriction in the choice of operating frequency and accelerates the method for selecting the operating frequency.

In an advantageous development of the invention, at least one return channel can be activated between the base station and the microphone module. The connection between microphone module and base station is thus designed to be not only unidirectional but bidirectional. The additional return channel issues for transmitting an information item about the selected operating frequency and/or a free transmitting frequency. The advantage of this embodiment lies, on the one hand, in that after the selection of the operating frequency, the latter can be transmitted in automated manner via the return channel to the microphone module and can there be adjusted. However, it is also appropriate to transmit data via the transmitting frequencies to the microphone module for test purposes so that the microphone module can transmit test information via the transmitting frequencies in order to test the quality of reception at these transmitting frequencies.

If the microphone system has a plurality of microphone modules and base stations, it is an advantageous development of the invention if the microphone system has means for allocating and/or controlling the order in which the operating frequencies are issued for the microphone module-base station allocation. This is because, in this case, the task is to allocate the microphone modules to the base stations and to assign an operating frequency to each allocation without issuing the operating frequencies twice and/or issuing them into frequency bands which are disturbed by operating frequencies already issued and/or which could disturb the operating frequencies already issued. In particular, disturbances could be based on cross modulations or intermodulation products. The intermodulation products are formed in the case where two operating frequencies F1 and F2 are arranged adjacent to one another, wherein, e.g., the third-order intermodulation products are arranged at the frequency Fmod=(2*F1−F2) or Fmod=(2*F2−F1). Furthermore, disturbances can occur in the case of disadvantageous conditions of positioning of the base station or of the microphone modules, respectively, disadvantageous transmitting power distribution and adjacent transmitting frequencies. The management of the operating frequencies or the management of the sequence of issuance of the operating frequencies can be implemented by the means.

In a particularly preferred manner, the microphone system has a control device as the means which is designed for holding the list of free transmitting frequencies and distributing the operating frequencies to the plurality of microphone module-base station allocations, taking into consideration the intermodulation products. By means of the control device it is possible to distribute the operating frequencies as a central device from the free transmitting frequencies in such a manner that interactions between the individual microphone module-base station allocations are only lightly developed or are minimized.

A further subject matter of the invention relates to a method for selecting an operating frequency for a microphone system, preferably for a microphone system having at least one base station and at least one microphone module, wherein audio information or test information is/or can be transmitted to the base station from the microphone module on an operating frequency and wherein the quality of reception of a number of transmitting frequencies is analyzed.

According to the invention, it is provided that the operating frequency is selected automatically from the number of transmitting frequencies, taking into consideration the quality of reception analyzed. The method once again reflects the inventive concept of providing for an automatic selection, and thus also optimization of the operating frequency, from a number of transmitting frequencies.

After the selection of the operating frequency, the latter is displayed in a first possibility of the method and must be set manually by a user on the microphone module. The operating frequency is preferably set automatically at the base station.

In a second embodiment of the invention, an information item about the operating frequency is transmitted to the microphone module so that the operating frequency is set in automated manner both as transmitting frequency at the microphone module and as receiving frequency at the base station.

In an advantageous development of the invention, the transmitting frequency spectrum is preferably analyzed for free transmitting frequencies before the selection of the operating frequency, the quality of reception only of free transmitting frequencies being subsequently analyzed. Due to the fact that disturbed or occupied transmitting frequencies or bands are not analyzed, this section of the method can be executed more effectively and thus more rapidly.

Various options are conceivable with respect to the sequence of the method:

In a first alternative of the method, all free frequencies are initially found by the frequency analysis module and transmitted to the microphone module as transmitter, for example in the form of a table. Following this, the microphone module transmits a test sequence on all free frequencies, especially of the table imparted. The reception analysis module in each case assesses the quality of reception and selects an operating frequency in dependency on the measured quality of reception. This operating frequency is imparted to the microphone module via the return channel and set as receiving frequency by the base station. The microphone module then sets the selected operating frequency as transmitting frequency so that audio information can be transmitted.

In a second alternative of the method, the aforementioned steps are not processed in the manner of a table but sequentially. In this case, it is verified from a lesser number or only from one transmitting frequency whether it is free, and conveyed to the microphone module. The microphone module transmits on the transmitting frequency conveyed and the reception analysis module assesses the quality of reception. These two steps are repeated until all transmitting frequencies or only all free transmitting frequencies are tested. After that, an operating frequency is selected again in dependence on the quality of reception measured or analyzed and, as already mentioned above, transmitted to the microphone module and the base station.

In a further alternative of the method, a procedure without return channel is also conceivable. In this context, it is provided that the microphone module transmits test frequencies or real audio information in accordance with a defined pattern, for example in fixed time intervals, on the transmitting frequencies and/or only on the free transmitting frequencies. As an alternative to the time intervals, the microphone module can inform the reception analysis module, e.g. via a transmitted intermediate information item, when it switches to the next transmitting frequency. In principle, it is also possible that the microphone module informs the reception analysis module which transmitting frequency it will switch to next. The reception analysis module assesses for each transmitting frequency the quality of reception and selects an operating frequency in dependence on the quality of reception and represents it at the operating panel, for example at a display. Following this, the user sets the operating frequency manually at the microphone module.

If a number of microphone module-base stations allocations are initialized, the selected process must be performed for each allocation. Preferably, test sequences are transmitted on the microphone systems already supplied with operating frequencies so that the subsequent microphone systems recognize that these operating frequencies are already occupied and/or detect intermodulation products of these operating frequencies.

In the simplest case, the user must start the process manually for each allocation. In one development of the invention, the process can be simplified in that a start signal is forwarded from allocation to allocation. It is also possible that the sequence is managed and organized in particular, centrally by the previously described control device as master unit. In this case, the sequence of installation can take place as follows:

In a first step, free transmitting frequencies are detected and evaluated by the frequency analysis module. In a next step, the quality of reception and especially the received powers of the individual allocations are checked, which, in particular, depend on the respective distance between microphone module and base station. In a next step following, the control device calculates suitable operating frequencies for each allocation taking into consideration the quality of reception and all relevant intermodulation products. In a last step, the operating frequencies are allocated to the allocations, particularly the microphone modules and the base stations allocated.

As an alternative to the simultaneous distribution of the operating frequencies, an operating frequency can be specified sequentially for each allocation and this can be imparted to the allocation. Furthermore, free frequencies can be checked again by the frequency analysis module.

BRIEF DESCRIPTION OF THE DRAWINGS

Further features, advantages and effects of the invention are found in the subsequent description of a preferred exemplary embodiment of the invention and the attached figures, in which.

DETAILED DESCRIPTION

Corresponding parts or designations are in each case provided with mutually corresponding reference symbols.

Figure 1:
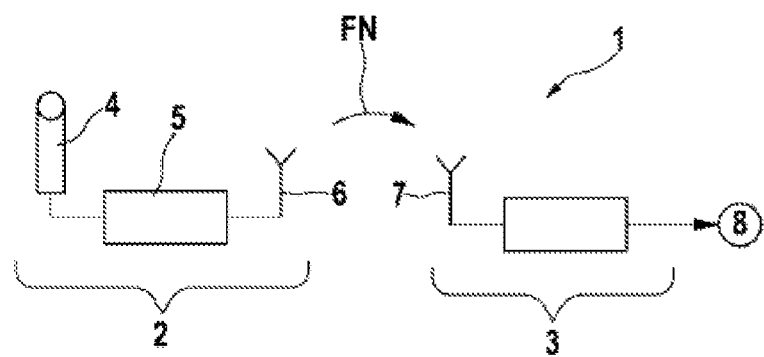
FIG. 1 shows a schematic block diagram of a microphone module-base station allocation as a first exemplary embodiment of the invention.

FIG. 1 shows a schematic representation of a microphone system 1 which comprises a microphone module 2 and a base station 3. The microphone module 2 has a microphone section 4 and a transmitting section 5 which can transmit audio signals, picked up with the microphone section 4 via an antenna 6, as audio information wirelessly to the base station 3. The latter receives the audio information by means of a further antenna 7 reconverts them, if necessary, into audio signals and transfers these to an audio sink 8 such as, for example, an amplifier, a recording device and the like. Such microphone systems 1 are used, for example, in public events such as discussions, plays, concerts etc. The wireless transmission takes place via an operating frequency Fn.

Figure 2:
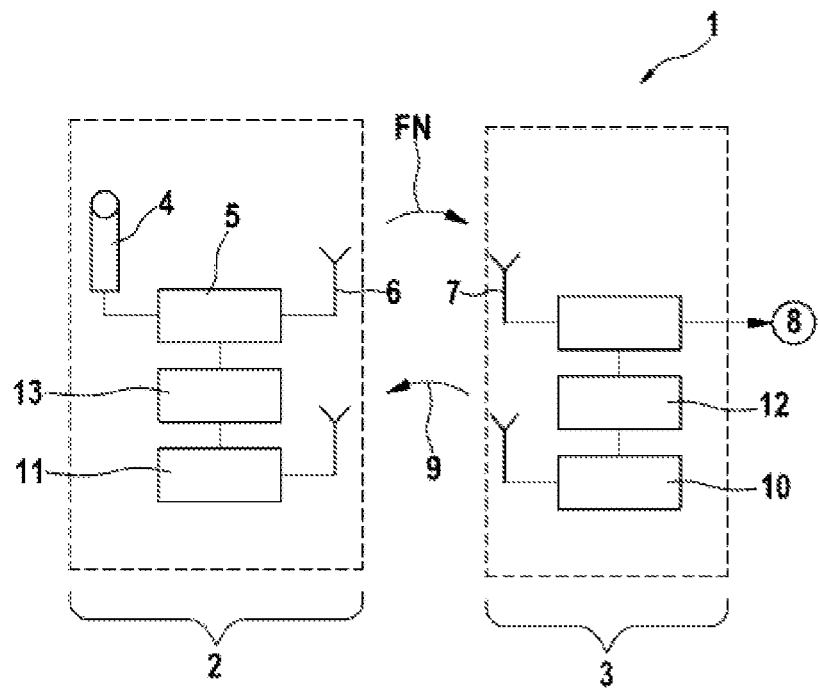
FIG. 2 shows the allocation in FIG. 1 in a modified form.

FIG. 2 shows an extension of the microphone system 1 in FIG. 1 wherein, apart from the wireless transmission of the audio information via the operating frequency Fn, a return channel 9 is provided which can also transmit control signals from the base station 3 wirelessly to the microphone module 2. For this purpose, the base station 3 has a return channel transmitter and the microphone module 2 a return channel receiver 11. The information which is transmitted via the return channel 9 is implemented by a control unit 12 on the side of the base station 3 and a control unit 13 on the side of the microphone module 2. For example, an information item about the operating frequency Fn is transmitted via the return channel 9 so that it can be set by the control unit 13 in transmitting section 5.

Figure 3:
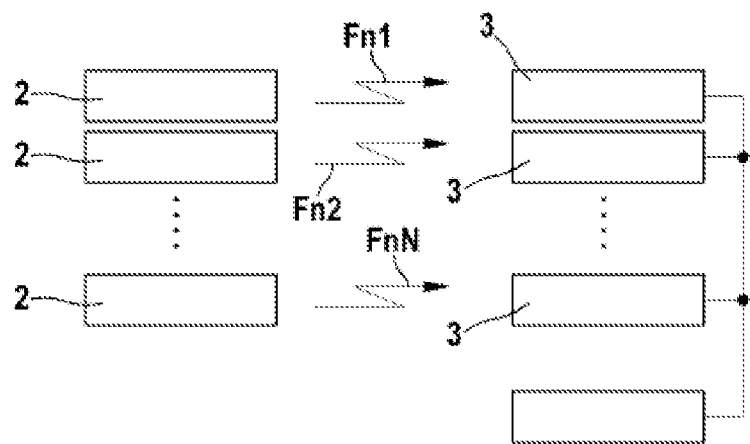
FIG. 3 shows a microphone system with a plurality of such allocations as a third exemplary embodiment of the invention.

FIG. 3 illustrates the situation when it is not only base station 3—microphone module 2 allocation which is provided but a plurality thereof. FIG. 3 shows N such allocations. So that the allocations can be transmitted undisturbed by one another, the operating frequencies Fn1 . . . FnN must be different. Additionally, the operating frequencies must have certain distances from one another, particularly in dependency on the transmitting power of the microphone modules 2 and the local vicinity to one another.

Figure 4A:
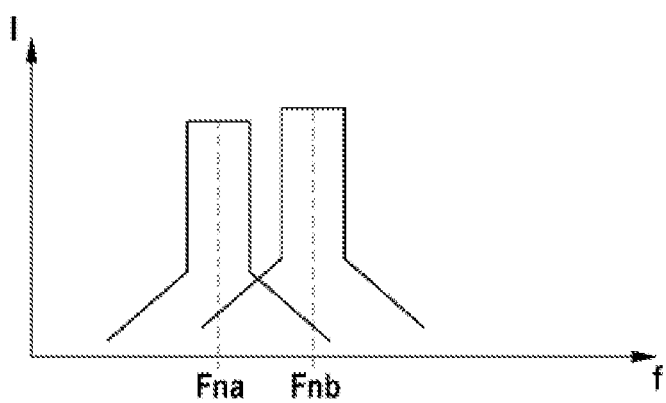
FIG. 4a shows a graph for illustrating disturbances by adjacent transmitting frequencies in the microphone modules.
Figure 4B:
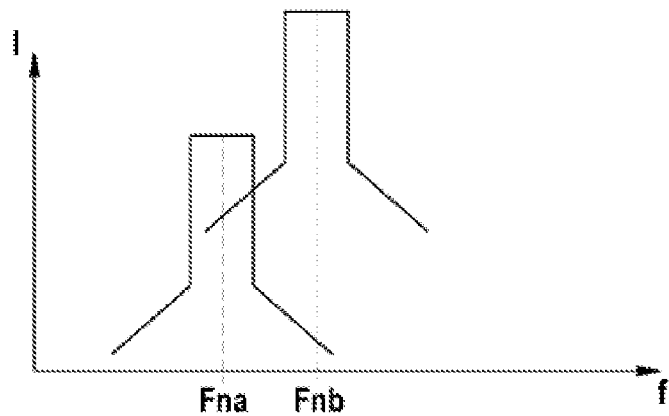
FIG. 4b shows the graph in FIG. 4a with other transmitting powers.
Figure 5:
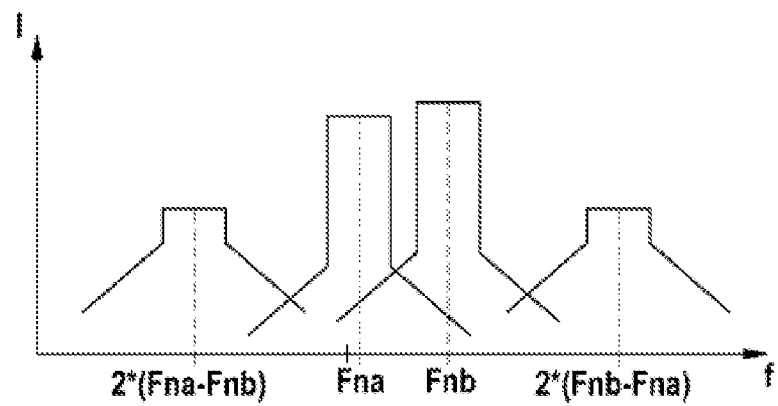
FIG. 5 shows a graph for representing the production of intermodulation products.

This set of problems is illustrated, for example, in FIG. 4a which shows a graph in which frequency f is plotted highly schematically with respect to a received power 1 at the base stations 3. Two distributions around two operating frequencies Fna and Fnb are shown which show a similar received power 1. As can be seen from the graph, the distance between the two frequencies is adequate. FIG. 4b in contrast, shows the situation if the received powers 1 are of quite different strength, the received power around the operating frequency Fnb being distinctly greater than the received power 1 around the operating frequency Fna. The intensity distribution of frequency Fnb distinctly overlaps the intensity distribution of frequency Fna with one shoulder so that it can be expected that the operating frequency Fnb interferes with the operating frequency Fna. In the distribution of the transmitting powers shown, the distance between frequencies Fna and Fnb has been selected as being too small. Another possible interference is shown in FIG. 5, wherein, apart from the main frequency distribution of the operating frequencies Fna and Fnb, intermodulation products are shown which are located at frequencies 2×(Fna−Fnb) and 2×(Fnb−Fna). At these frequencies, it is not sensible to position further operating frequencies since these would be disturbed by the interpolation products.

Figure 6A:
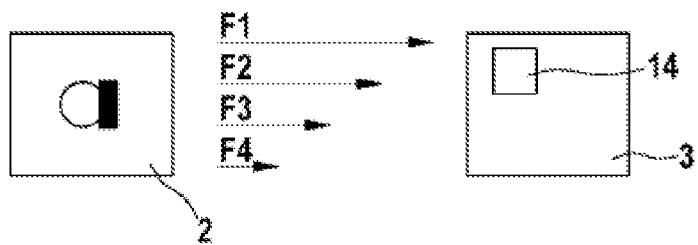
FIG. 6a, b show the allocation in FIG. 2 in a method for selecting an operating frequency as a further exemplary embodiment of the invention.
Figure 6B:
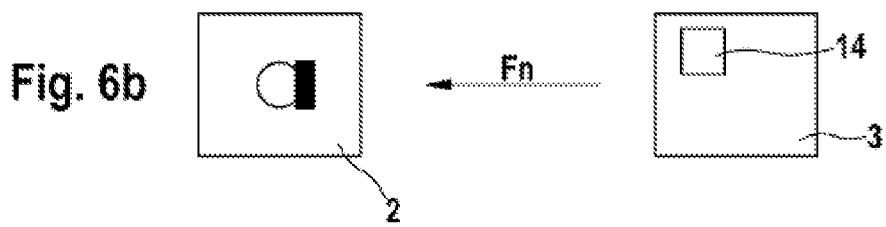
Figure 7:
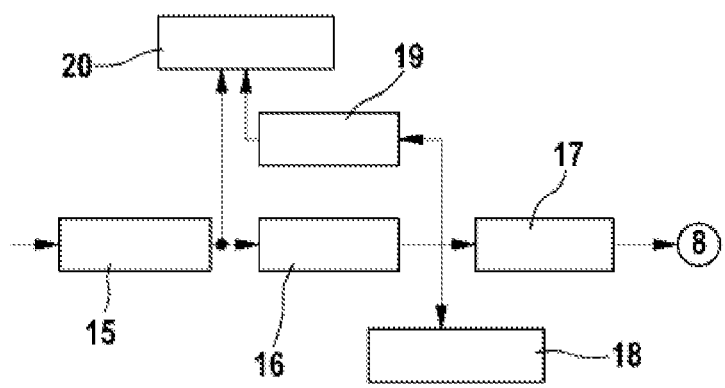
FIG. 7 shows a block diagram for illustrating options for assessing the qualities of reception.

FIGS. 6a, b illustrate a first exemplary embodiment of a method for setting up a microphone system 1, in accordance with FIG. 2 for example. In a first step, test information is transmitted from the microphone module 2 to the base station 3 on different transmitting frequencies F1 . . . F4. A reception analysis module 14 analyzes the quality of reception and thus the quality of transmission at the different transmitting frequencies. If the audio information or test information transmitted is coded digitally, it is possible to use, for example, the bit error rate or the channel bit error rate as an error magnitude. The determination of these two parameters is outlined in FIG. 7. Firstly, the signal received is entered into a demodulator 15 and subsequently conducted into a channel decoder 16, the redundancy in the signal being utilized for reducing the error rate. Before the signal is conducted to the audio sink 8, additional audio processing 17 can take place.

If the microphone module 2 transmits a bit sequence known to the base station 3, for example during the installation process, the reception analysis module 14 can determine the bit error rate by means of a comparison of the known bit sequence with the bit sequence in a bit error rate calculation module 18 behind the channel decoder 16. In the case of unknown bit sequences, the reception analysis module 14 can encode the decoded bit sequence again in a channel encoder 19 after the channel decoder 16 and compare it with the bit sequence before the channel decoder 16. By this means, the so-called channel bit error rate can be estimated by a channel bit error rate module 20.

On the basis of these error parameters, the reception analysis module 14 can select a suitable operating frequency and transmits this operating frequency Fn via the return channel 9 to the microphone module 2 which then sets the operating frequency as the transmitting frequency.

Figure 8:
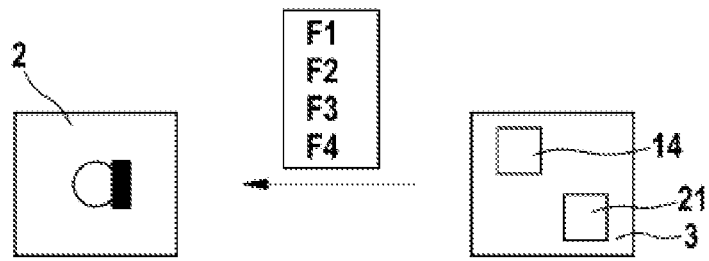
FIG. 8 shows in identical representation to FIGS. 7a, ban extension of the method.

FIG. 8 shows an extension of the method in FIGS. 6a, b, wherein the base station 3 additionally has a frequency analysis module 21 or is coupled to it. The frequency analysis module 21 examines the possible transmitting frequencies for free transmitting frequencies. In this step, it is taken into consideration that most microphone systems 1 are operated in the VHF/UHF frequency band which is also utilized by terrestrial television. The microphone systems 1 are thus second users of this frequency band so that the microphone systems 1 must only use free transmitting frequencies, that is to say those not occupied by television, at the site where they are used. Additionally, other disturbances can result from the interactions shown in FIGS. 4a, b and 5. The frequency analysis module 21 carries out a first selection of free transmitting frequencies which are transferred to the microphone module 2, for example as a table, so that the test information is transmitted only and exclusively via the transmitting frequencies determined as being free by the frequency analysis module 21.

In the case where no return channel 9 is present such as, for example, in the microphone system 1 according to FIG. 1, the microphone module 2 can scan the transmitting frequencies in accordance with a predetermined pattern or, before changing the transmitting frequency, in each case convey a corresponding information item to the base station 3 so that the latter measures the quality of reception at the correct transmitting frequencies. The operating frequency Fn is set at the microphone module 2, for example by the correspondingly selected operating frequency Fn being displayed on the base station 3 and a user having to set it at the microphone module 2.

Figure 9:
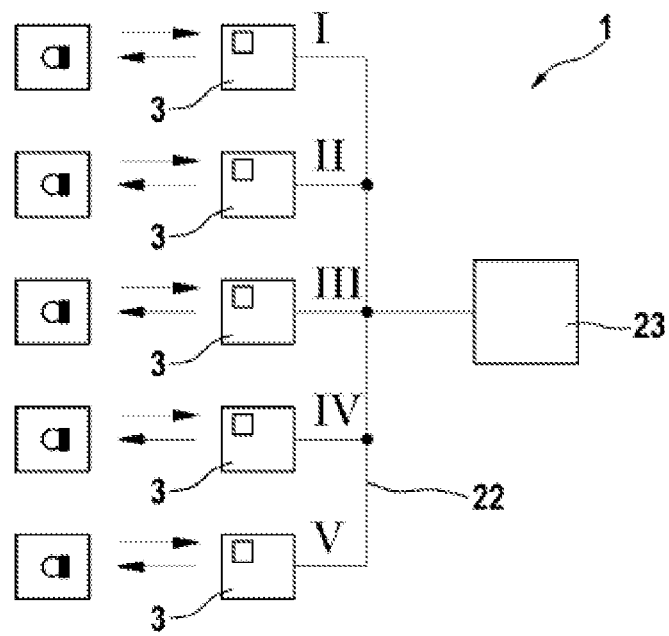
FIG. 9 shows a block diagram of a microphone system having a plurality of allocations with a first option of coordination.

FIG. 9 shows a microphone system 1 which, according to FIG. 3, comprises a plurality of allocations. The base stations 3 are connected to one another via a network 22 and additionally coupled to a central control device 23. In this simple embodiment, the control device 23 controls only the order in which the tests are carried out according to FIGS. 6a, b and 8. Thus, it assigns position 1, for example, to the allocation in the first row, the latter then being allowed to be the first one to look for the operating frequency Fn1. Once the process has been concluded the allocation in the second row is started with position II etc. In a particularly preferred manner, allocations continuously transmit test information or audio information after the setting of the operating frequency so that the disturbances are generated selectively in the transmitting spectrum according to FIGS. 4b and 5 and are taken into consideration in the analysis of the quality of reception of the subsequent allocation. It is also possible that the process is carried out several time iteratively so that the allocations set first also obtain an operating frequency which is not impaired by disturbances of allocations set later.

Figure 10:
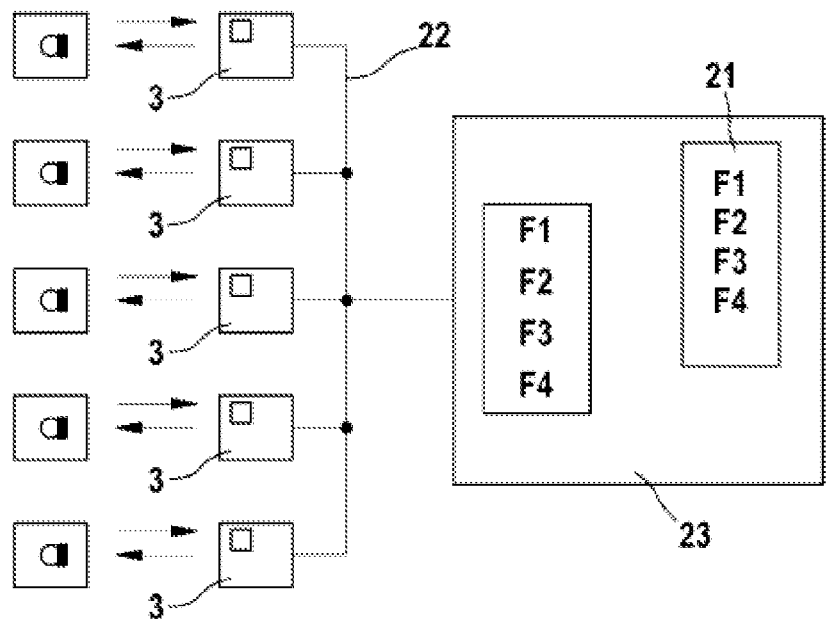
FIG. 10 shows the microphone system in FIG. 9 in a development as a next exemplary embodiment of the invention.

FIG. 10 shows a development of the invention wherein the control device 23 is designed as a master which has both, on the one hand, the frequency analysis module 21 and examines the transmitting spectrum for free transmitting frequencies. These are then present centrally as a list in the control device 23. Once the test cycle for analyzing the quality of reception has been run for each allocation, the results, that is to say the qualities of reception, are signaled back to the control device 23 which then generates the operating frequencies Fn1 . . . F4 simultaneously for all allocations. Due to the fact that the operating frequencies are determined centrally by the control device 23, interactions such as cross modulations, intermodulation products, superpositions etc. between the individual allocations can be either calculated or measured in a further step and taken into consideration during the generation of the operating frequencies.

LIST OF REFERENCE DESIGNATIONS

1 Microphone system
2 Microphone module
3 Base station
4 Microphone section
5 Transmitting section
6 Antenna
7 Antenna
8 Audio sink
9 Return channel
10
11 Return channel receiver
12 Control unit on the side of base station 3

13 Control unit on the side of microphone module 2
14 Reception analysis module
15 Demodulator
16 Channel decoder
17 Audio processing
18 Bit error rate calculation module
19 Channel decoder
20 Channel bit error rate module
21 Frequency analysis module
22 Network
23 Control device

The invention claimed is:

1. A microphone system (1) having a base station (3) and having a microphone module (2), wherein the base station (3) is designed to receive information, transmitted on an operating frequency, wirelessly from the microphone module (2), wherein the base station (3) has a reception analysis module (14) and/or is coupled to the reception analysis module (14) which is designed for analyzing the quality of reception of the information at a number of possible transmitting frequencies, characterized in that the microphone module (2) transmits test information on the plurality of possible transmitting frequencies, the reception analysis module (14) selects the operating frequency from the plurality of possible transmitting frequencies based on the analysis of the quality of reception of the test information, and transmits the operating frequency via a return channel to the microphone module.

2. The microphone system (1) as claimed in claim 1, characterized in that the information is designed as digital signals.

3. The microphone system (1) as claimed in claim 2, characterized in that the quality of reception is analyzed on the basis of a bit error rate and a channel bit error rate.

4. The microphone system (1) as claimed in claim 1, characterized by a frequency analysis module (21) which is designed for analyzing a frequency spectrum for free transmitting frequencies.

5. The microphone system (1) as claimed in claim 1, characterized in that a return channel (9), which is designed for transmitting an information item about the operating frequency, can be activated between the base station (3) and the microphone module (2).

6. The microphone system (1) as claimed in claim 1, characterized by a plurality of microphone modules (2) and base stations (3), characterized by a central control device (23) for issuing of the operating frequencies for the microphone module (2)—base station (3) allocation.

7. The microphone system (1) as claimed in claim 1, characterized by a control device (23) which is designed for holding a list of free transmitting frequencies and distributing operating frequencies, taking into consideration intermodulation products of the operating frequencies.

8. A method for selecting an operating frequency for a microphone system (1) having at least one base station (3) and at least one microphone module (2), wherein the base station (3) is designed to receive information, transmitted wirelessly on an operating frequency, from the microphone module (2), wherein the microphone module (2) transmits test information on a plurality of possible transmitting frequencies, wherein a quality of reception is analyzed at the plurality of transmitting frequencies, characterized in that the operating frequency is selected automatically from the plurality of transmitting frequencies, taking into consideration the quality of reception based on the analysis of the quality of reception of the information, and the operating frequency is transmitted via a return channel to the microphone module.

9. The method as claimed in claim 8, characterized in that the transmitting frequency spectrum is analyzed for free transmitting frequencies, wherein the quality of reception of only the free transmitting frequencies is analyzed subsequently.

10. A non-transitory computer readable medium containing a computer program having program code for carrying out all the steps of the method as claimed in claim 8 when the program is executed on a computer.

11. The microphone system (1) as claimed in claim 1, characterized in that the information is audio information and test information.

12. The microphone system (1) as claimed in claim 1, characterized in that the information is audio information.

13. The microphone system (1) as claimed in claim 1, characterized in that the information is test information.

14. The microphone system (1) as claimed in claim 2, characterized in that the quality of reception is analyzed on the basis of a bit error rate.

15. The microphone system (1) as claimed in claim 2, characterized in that the quality of reception is analyzed on the basis of a channel bit error rate.

16. The microphone system (1) as claimed in claim 6, characterized in that the central control device (23) allocates and controls the order of issuance of the operating frequencies.

17. The microphone system (1) as claimed in claim 6, characterized in that the central control device (23) allocates the order of issuance of the operating frequencies.

18. The microphone system (1) as claimed in claim 6, characterized in that the central control device (23) controls the order of issuance of the operating frequencies.

19. The method as claimed in claim 8, characterized in that the information is audio information and/or test information.

20. A non-transitory computer readable medium containing a computer program having program code for driving the microphone system (1) as claimed in claim 1 when the program is executed on a computer.

* * * * *